United States Patent [19]
Garrett et al.

[11] 3,764,247
[45] Oct. 9, 1973

[54] APPARATUS FOR MOLDING HARDENABLE MATERIALS

[75] Inventors: Walter L. Garrett, Freeland; Thomas D. Ray, Saginaw, both of Mich.

[73] Assignee: The Dow Chemical Company, Midland, Mich.

[22] Filed: May 30, 1972

[21] Appl. No.: 258,064

Related U.S. Application Data

[60] Division of Ser. No. 55,933, July 17, 1970, which is a continuation-in-part of Ser. No. 731,858, May 24, 1968, abandoned.

[52] U.S. Cl. ............... 425/224, 425/115, 425/122, 425/471, 425/371
[51] Int. Cl. ............... B29c 15/00, B29c 17/00
[58] Field of Search ................. 425/115, 122, 377, 425/224, 4, 447, 471; 264/47, 48, 58, 166, 313, 316

[56] References Cited
UNITED STATES PATENTS

| | | | |
|---|---|---|---|
| 775,540 | 11/1904 | McConnell | 425/122 X |
| 2,929,793 | 3/1960 | Hirsh | 425/224 X |
| 3,601,848 | 8/1971 | Zuppel, Jr. | 425/115 |
| 3,152,361 | 10/1964 | Edwards | 425/224 |
| 3,382,303 | 5/1968 | Steig | 425/224 X |
| 3,560,599 | 2/1971 | Ferstenberg | 425/122 |
| 3,585,680 | 6/1971 | Eisenmann | 425/115 X |
| 3,604,054 | 9/1971 | Eisenmann et al. | 425/115 |

*Primary Examiner*—Robert L. Spicer, Jr.
*Attorney*—Richard G. Waterman et al.

[57] ABSTRACT

Hinged endless belts are employed in a continuous casting machine to define a mold cavity closed on all four sides wherein castable materials such as foamable hardenable plastics are continuously shaped without waste.

6 Claims, 14 Drawing Figures

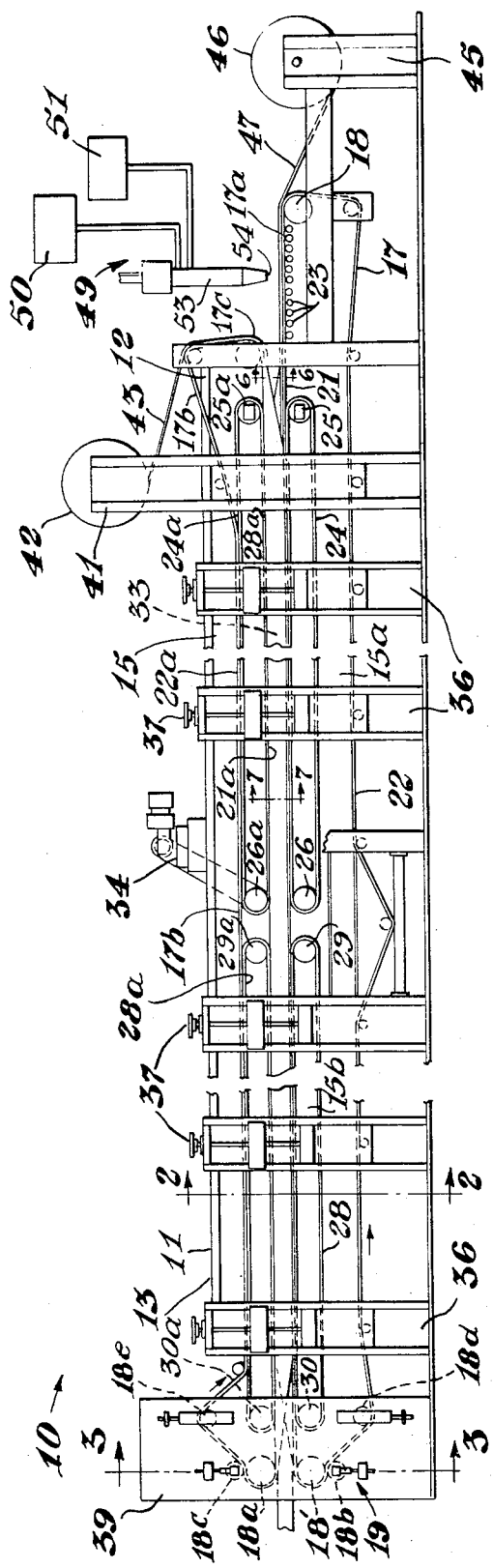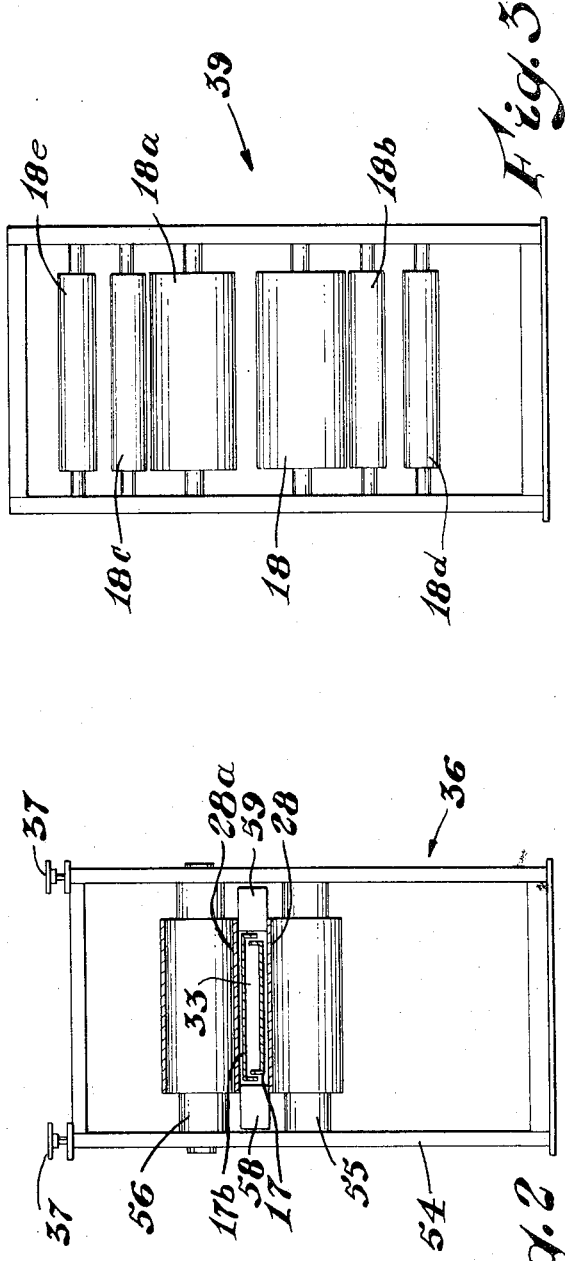

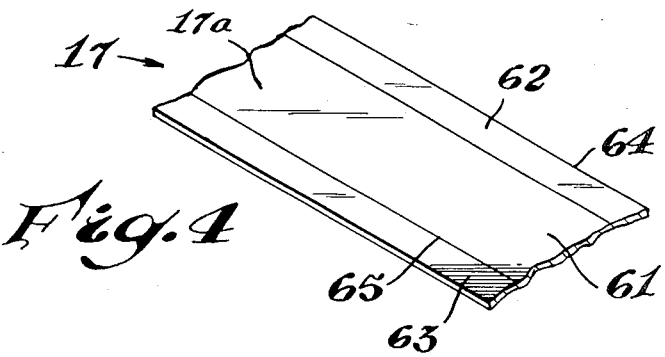
Fig.4
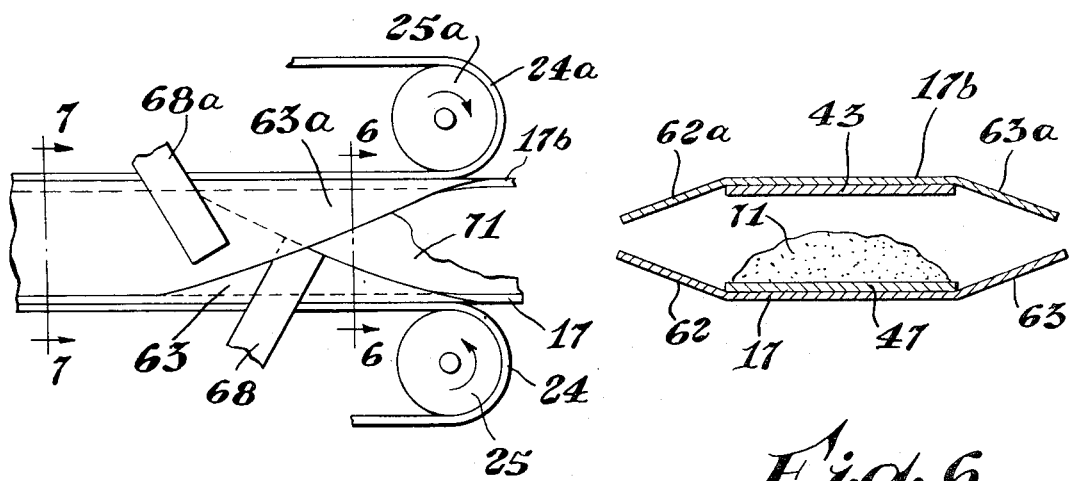
Fig.5
Fig.6
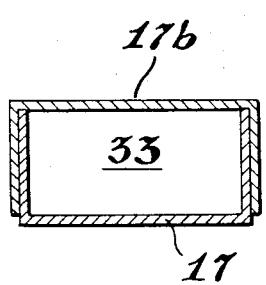
Fig.7
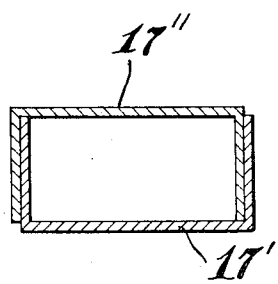
Fig.8

APPARATUS FOR MOLDING HARDENABLE MATERIALS

RELATED U.S. APPLICATIONS

This application is a divisional application of our co-pending application Ser. No. 55,933, filed July 17, 1970, which in turn is a continuation-in-part of our co-pending application Ser. No. 731,858, now abandoned filed May 24, 1968.

This invention relates to a method and apparatus for the continuous casting of hardenable materials, and more particularly relates to an improved apparatus and method for the continuous casting of hardenable materials to a predetermined cross-sectional configuration.

Many machines and methods are known for the continuous casting of hardenable materials and particularly for the continuous casting of foamable hardenable materials. Frequently in the continuous casting of foamable hardenable materials, one of the significant and substantial wastes is the necessity of casting the material in a form which approximates the desired form and which must be trimmed to the desired configuration. Trimming results in loss of material which is particularly vexatious and wasteful wherein the material being cast cannot be economically reprocessed in a casting process or apparatus. For example: in the preparation of hardenable foamable plastic compositions such as thermosetting polyurethanes or phenolic materials, an irreversible chemical reaction occurs and the trim scrap is of value generally only as an inert filler, if indeed, it is useable at all. Various attempts have been made to provide cast configurations which approximate the cross-sectional configuration of the desired end product and eliminate trim scrap. One contribution in this field is set forth in U.S. Letters Patent 3,123,856 wherein a foamable hardenable synthetic resinous material is cast in a paper trough and the quantity of trim scrap is substantially reduced. However, the use of a paper web to form a trough results in a sacrificial layer which frequently must be removed prior to using the product, usually by a trimming operation. Recoverable webs have been employed on continuous plastic casting apparatus. For example: a thin polyethylene film may be disposed on the surface of suitable supporting belts, the foamable mixture placed on the polyethylene, the web employed to support the foamable mixture until it is cured, the web stripped therefrom and subsequently re-used at a later time. Such techniques known to the art generally result in (1) trim scrap, (2) a sacrificial shaping web, or (3) a release web such as polyethylene which is of limited re-use.

It would be desirable if there were available an improved method for the casting of hardenable materials which would permit casting materials to a desired cross-sectional configuration.

It would also be desirable if there were an improved method and apparatus for casting hardenable materials to a desired cross-sectional configuration without significant trim scrap or sacrificial webs of limited re-usability.

It would also be desirable if there were available a continuous casting method and apparatus which would permit the formation of articles having closely controlled cross-sectional configurations from foamable hardenable materials.

These benefits and other advantages in accordance with the method of the present invention are achieved by providing at least one first endless continuous belt, the endless belt passing over a belt support and forwarding means and at least one remotely located support means, the belt forming loop having a forming side and a return side, the belt having a casting or forming surface of a non-adherent generally continuous character, depositing on the non-adhering surface of the forming side of the belt a hardenable composition, deforming the belt without exceeding its elastic limit to define a desired configuration, hardening the hardenable material to a self-supporting condition, removing the belt from the hardened material.

Also contemplated within the scope of the present invention is an improved apparatus for the continuous casting of hardenable materials, the apparatus comprising in cooperative combination at least a first support or drum and a second support or drum, an endless forming belt, the forming belt passing over the first drum and the second drum forming a continuous loop having a forming side and a return side, the belt having a generally continuous surface which is non-adherent to the hardenable material being formed, means to apply a hardenable material to the non-adherent surface, means to deform the belt to form a desired curing configuration for the hardenable material.

Further features and advantages of the present invention will become more apparent from the following specification when taken in connection with the drawing wherein:

FIG. 1 schematically depicts a fractional view of one embodiment of an apparatus in accordance with the invention.

FIG. 2 is a sectional view of the apparatus of FIG. 1 taken along the line 2—2.

FIG. 3 is a schematic sectional view of the apparatus of FIG. 1 taken along the line 3—3.

FIG. 4 depicts one forming belt of the apparatus of FIG. 1.

FIG. 5 is a detailed view of a portion of the apparatus of FIG. 1 showing deformation of the forming belts.

FIG. 6 is a sectional view of the arrangement of FIG. 5 taken along the line 6—6 thereof.

FIG. 7 is a sectional view of FIG. 5 taken along the line 7—7 thereof.

FIG. 8 depicts an alternate configuration of forming belts employed in the apparatus of FIG. 1.

Figure 9:
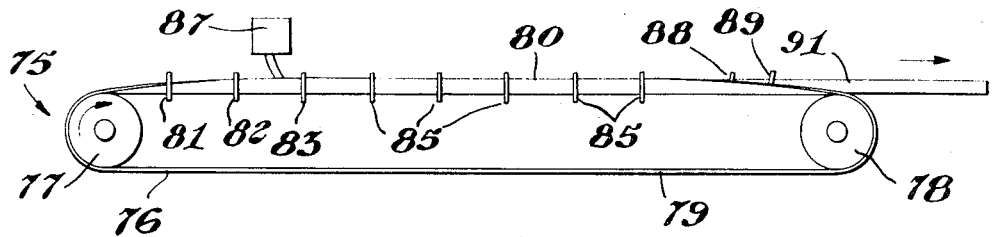
FIG. 9 is a schematic representation of an alternate form of an apparatus in accordance with the present invention.

FIGS. 10, 11, 12 and 13 schematically depict views of belt formers employed with the apparatus of FIG. 9.

Figure 14:
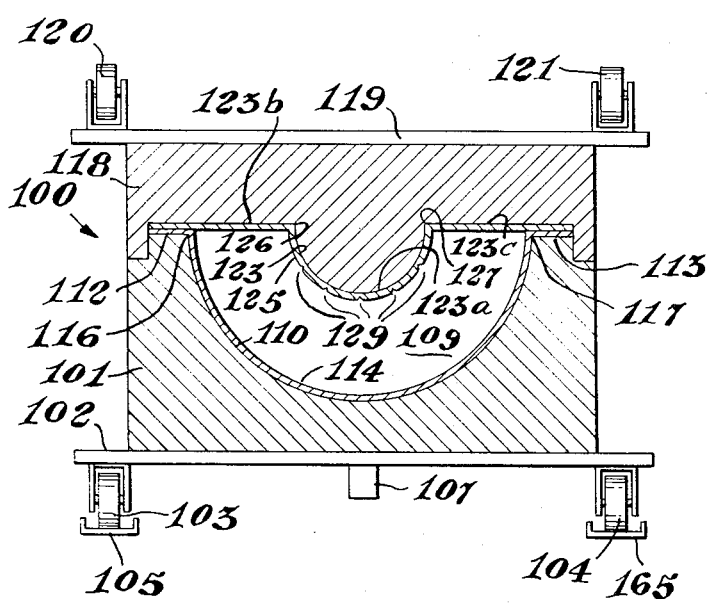

FIG. 14 depicts an alternate embodiment of the invention employing a pair of opposed forming belts which define a cavity having an arcuate cross-section.

In FIG. 1 there is schematically depicted an apparatus in accordance with the present invention generally designated by the reference numeral 10. The apparatus 10 comprises in cooperative combination a frame or support means 11. The frame or support means 11 has a first or feed end 12 and a second or exit end 13. The frame 11 forms a portion of a temperature control region or zone 15 which is divided into a first temperature control region or zone 15a adjacent the feed end 12 and a second temperature control region or zone 15b generally adjacent the second end 13. A first forming belt 17 is disposed in the form of an endless loop which extends from the feed end 12 to the exit end 13.

The first forming belt 17 passes over a first idler or support roll 18 disposed at one end of the temperature control region 15, passes through the zone 15 and is supported on a second idler or support roll 18' adjacent the second end 13 of the apparatus 10. A belt tensioning means 19 is disposed generally adjacent the second idler 18'. Thus, the belt 17 forms a continuous loop having a forming side 21 and a return side 22. Adjacent the idler or direction changing roll 18 are a plurality of support rolls 23 adjacent the forming side 21 of the belt 17. A first support or driving belt 24 is disposed within the loop formed by the belt 17 and supported by an idler roll 25 and a driving roll 26. The first support belt 24 is disposed generally within the first temperature control zone 15a. A second support belt 28 is in operative engagement with the forming side 21 remote from the forming face thereof and is generally coextensive with the second temperature control zone 15b. The belt 28 is supported on a first roll 29 and a second roll 30. The support belts 24 and 28 are oppositely disposed to a continuous forming face 17a of the belt 17 and maintain the forming face 17a in a desired configuration. Oppositely disposed to the first forming belt 17 is a second forming belt 17b having a continuous forming face 17c. The forming belt 17b has a forming side 21a in spaced generally parallel relationship to the forming side 21 of the belt 17 and a return side 22a remotely disposed therefrom. A support belt 24a is supported by a first idler roll 25a and a driven roll 26a and is oppositely disposed in spaced relationship to the belt 24. Similarly, a support belt 28a is oppositely disposed and in spaced relationship from the belt 28. The belt 28 is supported by a drive roll 29a. Thus, the support belts 24a and 28a define a space or forming cavity 33 lying therebetween through which the forming belts 17 and 17a pass as they are driven in the direction indicated by the arrows by means of a drive mechanism 34 operatively connected to the drive rolls 26, 26a, 29 and 29a in such a manner that the surface speed of each of the rolls is equal and moves in the appropriate direction to forward the forming belts 17 and 17b in the appropriate direction. A plurality of support stands 36 are disposed in spaced relationship to each other along the length of the frame and provide spacing means for the adjacent support belts 24, 24a, 28 and 28a. A schematic representation of such support is depicted in FIG. 2. Each of the support stands 36 is provided with an adjusting means 37 which permits adjustment of the spacing between the forming belts 17 and 17b. A belt tension stand 39 is disposed adjacent the second end 13 of the frame 11 and permits tensioning of the forming belts 17 and 17b. A belt support and first web supply stand 41 is disposed generally adjacent the first end 12 of the frame 15. The stand 41 supports a web supply 42 adapted to supply a web 43 to the forming face 17c of the belt 17b. A second or lower web supply stand 45 is disposed adjacent the roll 18 and carries a web supply 46 adapted to supply a web 47 to the forming surface 17a of the belt 17. A hardenable material supply means 49 is disposed adjacent the first end 12 of the frame 11. The material supply means 49 comprises a first component source 50 and a second component source 51 operatively connected to a mixing and dispensing head 53 having a discharge 54. The dispensing means 49 is adapted to discharge a hardenable material from the discharge 54 onto a surface 17a of the belt 17 where it is carried into the forming space 33 defined by the oppositely disposed forming belts 17 and 17b. Beneficially, the discharge unit 49 may be of either the fixed or traversing variety, depending upon the particular configuration of the forming space 33 defined between adjacent surfaces of the belts 17 and 17b.

In FIG. 2 there is depicted a schematic representation of a stand 36 which comprises a stand frame 54 having adjustably positioned therein a first support roll 55 and a second support roll 56 in generally spaced apart parallel relationship adapted to carry the support belt such as the support belts 28 and 28a. The first forming belt 17 and second forming belt 17b are carried between the support belts 28 and 28a. The belts 17 and 17b have been deformed to define an elongate forming configuration or space 33 having a rectangular cross-sectional shape. A first edge retaining member 58 and a second edge retaining member 59 are disposed between the rolls 55 and 56 to provide positive positioning of the edges of the forming belts 17 and 17b.

In FIG. 3 there is depicted a view of the roll arrangement of the belt tensioning stand 39 taken along the line 3—3 of FIG. 1. The belt tensioning stand depicts the rolls 18' and 18a and the relationship to the first spring loaded idlers 18b and 18c which are resiliently tensioned toward the axis of rotation of the rolls 18' and 18a, respectively. A pair of tensioning rolls 18d and 18e are resiliently urged in a direction away from the rolls 18' and 18a, respectively.

In FIG. 4 there is depicted a view of a portion of the forming belt 17. The forming belt 17 comprises a central section 61, a first edge portion 62 and a second oppositely disposed edge portion 63. The belt 17 has a face 17a of a non-adhering material. The edge 62 is joined to the body portion 61 by first hinge means 64 and the second portion 63 is joined to the central portion 61 by a second hinge means 65. The hinge portions 64 and 65 permit the edge portions 62 and 63 to be disposed in angular relationship to the central portion 61. For example: by exerting suitable pressure on the edge portions 62 and 63, the portion of the belt 17 may be formed into a channel-like configuration.

In FIG. 5 there is schematically depicted a portion of the apparatus 10 generally adjacent the first end of the frame 11 depicting the belt configurations about the rolls 25 and 25a. The belts 17 and 17b are passed over the support belts 24 and 24a wherein edge portions designated as 63 for the belt 17 and 63a for the belt 17b are folded upward by means of belt deflecting means or forming shoes 68 and 68a, respectively, to form a generally rectangular cavity having a configuration of the space 33 of FIG. 2 and containing a foamable hardenable material designated by the reference numeral 71.

FIG. 6 depicts a schematic representation of a section taken along the line 6—6 of FIG. 5 showing the belt 17 having edge portions 62 and 63 in a partially folded position, the belt 17b wherein edge portions 62a and 63a are in a partially folded position, and webs 43 and 47 are disposed on the forming faces of belts 17 and 17b.

FIG. 7 represents the configuration of the belts taken along the line 7—7 wherein the belt 17 is formed into a rectangular channel-shaped configuration and is nested within a channel-shaped configuration defined by the belt 17b which defines a rectangular space 33 therein.

FIG. 8 depicts an alternate embodiment of the invention wherein a belt 17' is formed into a channel-shaped configuration and is in engagement with a similar belt 17'', each belt being bent into a channel-shaped configuration, and each belt having an external leg or edge portion.

In operation of the apparatus in accordance with the invention such as depicted by FIGS. 1–8, a hardenable material is discharged from the discharge means 54 of the supply means 49 onto the adjacent surface of the belt 17, or optionally, onto the surface of a web such as the web 47 carried by the surface of the belt 17. The belts 17 and 17b move into the first end 12 of the frame 11 wherein the forming shoes, such as the shoes 68 and 68a, form each of the belts into a generally rectangular configuration such as depicted in FIGS. 7 or 8. Beneficially, the hardenable material is a foamable material, such as polyurethane or phenolic foam, which hardens and foams during its passage between the first end 12 and the second end 13 of the apparatus 10. The belts 17 and 17b form what in essence may be considered a continuous mold within which the hardenable material is cured and subsequently discharged as a foam or plank from the second end of the apparatus. The belt edges are folded out of the plane of the belt and toward the opposite belt at the first end of the apparatus and unfolded at the opposite end. The support stands 36 and the supporting rolls provide a relatively concise and controlled spacing throughout the entire length of the apparatus and permit a relatively waste-free product to be obtained.

The belt configuration as employed in FIG. 7, wherein the actual thickness of the belt is exaggerated for clarity, is particularly advantageous when a product of fixed width and variable thickness is to be prepared. By varying the spacing of the rolls 55 and 56 of the stands 36, a rectangular configuration is generally achieved which sufficiently approximates a rectangle for most construction purposes.

The configuration of FIG. 8 is particularly advantageous wherein various widths of plank or board are to be produced, and the retaining means 58 and 59 may be slotted to provide the desired degree of offset between two belts and vary the width of the cavity defined between the belts 17 and 17'.

In FIG. 9 there is schematically depicted an alternate embodiment of the invention wherein for the sake of clarity the temperature control zone is omitted. The apparatus of FIG. 9 is generally depicted by the reference numeral 75. The apparatus 75 comprises in cooperative combination a deformable flexible belt 76 having the form of an endless loop which passes about a first support drum 77 and a second support or driving drum 78. The loop formed by the belt 76 has a return side 79 and a forming side 80. A plurality of forming members 81, 82, 83, 84 and 85 engage the forming side 80 to deform it into a desired configuration. A material source 87 delivers a hardenable material to the forming side 80 of the belt 76 wherein the belt is deformed to provide a continuous mold open only on the ends. Stripping shoes 88 and 89 are remotely disposed from the material source 87 and are adapted to remove the belt 76 from a continuous shaped article 91 having a generally cylindrical configuration formed from the material dispensed from the material supply 87.

Figure 10:
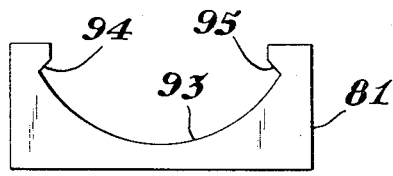

FIG. 10 depicts the configuration of the belt forming means 81. The forming means 81 defines therein an arcuate surface 93 which terminates in belt edge retaining portions 94 and 95, respectively.

Figure 11:
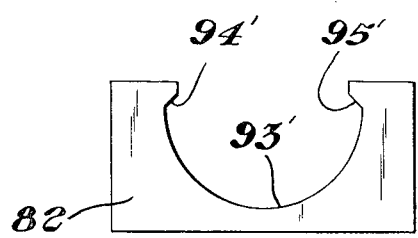

FIG. 11 shows the former 82 which is generally similar in configuration to the former 81 but has an arcuate surface 93' having a length about equal to the arcuate surface 93 but on a smaller radius. Belt edge retaining lips 94' and 95' are defined at the terminal ends of the arcuate surface 93'.

Figure 12:
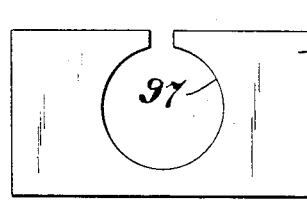

FIG. 12 depicts the configuration of the former 83 which defines an arcuate internal surface 97 generally equal in length to the arcuate surface 93' and having a still smaller radius.

Figure 13:
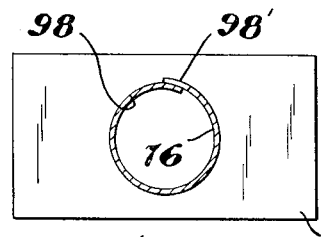

FIG. 13 depicts a configuration of the former 85 which defines a generally internal circular configuration 98 wherein a portion of the surface 98' has been offset to cause minor overlap of the belt 76 shown disposed therein.

Operation of the apparatus of FIG. 9 is substantially similar to that of the operation of FIG. 10 with the exception that a single deformable belt is employed. The specific embodiment depicted in FIGS. 9–13 operates in the manner generally similar to that of the apparatus 10 of FIGS. 1–8. A hardenable foamable material is introduced to a cavity formed by the deformable belt 76, the belt carried through a suitable temperature control zone such as a curing oven. The belt is then optionally disengaged from the formed article, such as the article 91, by stripping shoes 88 and 89 to provide what in essence is a continuous cylindrical mold defined by a single belt.

In FIG. 14 there is depicted a configuration generally designated by the reference numeral 100 which comprises a first or female forming block 101 supported on a carriage 102. The carriage 102 has rolls 103 and 104 in operative engagement with track members 105 and 106, respectively. An attachment means 107 is in operative engagement with a motion transmitting means 108 such as a chain or cable. The forming member 101 defines an internal cavity 109 which has a supporting surface of arcuate cross-section 110 adapted to engage and support a belt. The former 101 has a first belt sealing surface 112 and a second belt sealing surface 113 oppositely disposed on either side of the cavity 109. A first forming belt 114 is disposed within the cavity 109 and is in contact with the belt sealing surfaces 112, 113 and the arcuate surface 110. The belt 114 is hinged at locations 116 and 117 in a manner similar to the belt 17 depicted in FIG. 4. The portions 116 and 117 correspond to the junction of the belt sealing surfaces 112 and 113 with the belt supporting surface 110, respectively. Oppositely disposed to the cavity 109 is a male belt supporting member 118. The belt supporting member 118 is affixed to a carriage 119 having rollers 120 and 121, respectively, adapted to engage suitable tracks or ways, not shown. The belt supporting member 118 has a belt supporting surface 123 which comprises a convex arcuate portion 123a, a first planar portion 123b and a second planar portion 123c. The portions of the surfaces 123b and 123c remote from the portion 123a are disposed in generally parallel relationship to the belt sealing surfaces 112 and 113 of the forming member 101. On the surface 123 is disposed a deformable belt 125 which is hinged at locations 126 and 127 which lie at the junctions of the surfaces 123b and 123c, respectively. A portion of the belt 123 overlying the surface 123a is thinned or grooved at a plurality of points generally designated by the reference numeral 129 to provide conformability to the surface 123a.

Beneficially, the embodiment depicted in FIG. 14 is advantageously employed for the preparation of one half of a hollow cylinder such as pipe covering wherein a plurality of forming members such as the members 101 are affixed to a support belt generally equivalent to support belts 24 and 28 of the apparatus of FIG. 1, and a plurality of forming members 118 are affixed to a belt cable or chain generally equivalent to the belts 24a and 28a of the apparatus of FIG. 1. Thus, because of the flexibility of the belts, a wide variety of configurations may be continuously molded.

Generally, the material to be applied to the belt can be introduced to the feed end by any convenient method. Viscous foamable compositions are readily delivered by means of one or more nozzles simply discharging into the open end of the belt. If maximum uniformity of density in the foam is desired, two or more separate nozzles may be employed or a single slot-like nozzle utilized to more or less uniformly apply the foamable liquid composition across the width of the belt. For non-uniform viscous compositions, if the viscosity is sufficiently high that the rate of slumping or flow is substantially less than the speed of travel of the belt, a single nozzle is eminently satisfactory. For less viscous foamable materials, roll feed is oftentimes desirable wherein a roll and doctor knife are employed to form a layer of the material upon a feed roll and the material layer is removed from the feed roll by wiping against the belt at the feed end in the manner of a reverse roll coater. For extremely stiff materials, such as a relatively dry concrete mix, an L-shaped ram is eminently satisfactory wherein a quantity of materials such as a concrete mix is deposited on the belt. The L-shaped ram is employed to pack the material to a desired thickness. Such an L-shaped ram conveniently can be made from a piece of angle iron and a handle applied to one leg of the angle. In packing, the handle engaging leg is disposed vertically and the remaining leg disposed horizontally and remote from the belt. Optionally, an upper belt may be employed to smooth the upper surface, or a large spatula may be employed in the manner of a trowel to remove marks left by the packing tool.

Deformable belts for the practice of the present invention are readily formed from a wide variety of materials. The selection of the particular material will depend on the desired temperature of operation of the apparatus and can vary from metal belts, such as titanium, to belts of polyolefins. Advantageously for many applications, synthetic resinous belts prepared from linear polypropylene are eminently satisfactory because of their characteristic of forming integral hinges by merely flexing the belt in the location where the hinge action is desired, or by grooving the belt slightly and subjecting it to a suitable bending or flexing. Depending upon the strength of the support belt and pressures involved in the casting operation, such as when preparing foamable synthetic resinous materials, an all plastic belt may be employed or a laminated belt wherein metal or fabric belting is provided with a plastic face and hinge portions as required. Generally, it is desirable to rely entirely upon the plastic material for the hinge effect. For example: if it is desired to prepare a belt generally as depicted in FIG. 4, a continuous plastic facing such as polytetrafluoroethylene or polypropylene would be employed having adhered thereto three separate metal or fabric belting elements which would correspond to the central portion 61 and the edge portions 62 and 63. Alternately, belts are prepared employing essentially three separate metal belts wherein the plastic material is adhered thereto and acts as a hinge. For example: a graft copolymer of 3.28 weight percent acrylic acid on polypropylene gives excellent adhesion to stainless steel, aluminum and polypropylene. Advantageously, when the metal belt is in contact with the material being formed, a release coating is applied to the belt. The release coating may be of a temporary nature such as is typified by the silicone release agents which can be sprayed or roller-coated onto the belt, or alternately, a release coating such as polytetrafluoroethylene can be permanently adhered or impregnated into the surface of the belt. In certain instances, it may be desirable to provide variable restraint while a material is foaming. This is readily accomplished by providing a narrower spacing at the feed end of the belts than at the discharge end.

Beneficially, belts suitable for the practice of the present invention are also prepared from nylon, such as nylon 66, a condensation hexamethylenediamine of hexanethylenediamine and adipic acid; polyvinylbutyral, as well as the polyolefins hereinbefore set forth. Beneficially, a suitable hinge is prepared by coining; that is, applying highly localized pressure to the region of a belt where the hinge is desired, the pressure being sufficient to deform or cause cold flow of the belt material and reduce its thickness by from about 50 percent to 80 percent. Such thickness reduction is readily achieved in a platen press of sufficient size or by means of passing the belt through pressure rollers. If suitable pressure rollers or platen press is not available, the hinge can be readily prepared by scoring the belt with a suitable cutting tool, such as a V-shaped turning tool, or with a knife. Advantageously, the thickness of the material from which the belt is formed is from about 20 to 100 mils and the hinge portion being from about 10 to 20 mils in thickness, wherein the thickness of the hinge is about 50 to 80 percent of the thickness of the material forming the hinge. Usually in the preparation of foamed plastic material, it is desirable to employ a belt having an embossed surface. For example: a belt surface which has been embossed by pressing against wire cloth or woven wire mesh, such as 4 to 60 mesh per inch. This generally provides a foam product having excellent external appearance and eliminates small surface voids often obtained with a smooth surfaced belt.

It is critical and essential in the practice of the method of the present invention and in the apparatus of the present invention that the deformable belt never be deformed beyond its elastic limit. Thus, the distance from the support means or drums at either end of the belt where the forming belt is flat to a location where the belt has been deformed to a maximum degree, must be such that the deformation does not cause the belt to become permanently deformed. Such calculations are well within the skill of mechanical engineers, but by way of illustration: in the design of a belt to form a rectangular mold as depicted in FIGS. 1–8, if a belt has edge portions corresponding to portions 62 and 63 having a width $d$ (inches), and Y (inches) is the distance from the point where the belt leaves a turn around roll such as the roll 18 of FIG. 1 to the point where the edge portions such as the portions 62 and 63 are disposed in a plane normal to the plane of the center portion 61, Y in inches may be determined from the following equation:

$$Y = 141.4 \, (1/E^2 + 200E) \times 1/d$$

E is the elastic limit of the belt material. Y represents the minimum permissible distance in inches. Generally, it is desirable to increase this distance by a suitable safety factor such as from about 10 to 100 percent to assure relatively long belt life.

An apparatus generally similar to that depicted in FIG. 1 but having opposed supporting belts about 15 feet in length; that is, the distance between centers of the belt supporting drums, is provided with opposed polypropylene belts, each 40 mils in thickness and 12 inches in width. At each edge of each forming belt, a fold is made 1 inch from the edge and parallel thereto to provide a hinged edge section. The apparatus is adjusted in such a manner that the edge portions of the adjacent belts assume the configuration of FIG. 8 by means of suitable forming shoes at a distance (Y) of about 12 inches from the supporting rolls. The forming belts are enclosed within a temperature control housing. The belts are driven at like speed of about 4 feet per minute for a period of three days and no deterioration of the polypropylene belts is observed. A foamable phenol-formaldehyde composition is prepared by admixing 188 parts by weight phenol, 243 parts by weight of a 37 weight percent aqueous formaldehyde solution and one percent by weight sodium hydroxide based on the weight of the phenol. The components are charged into a stirred reaction vessel equipped with a reflux condenser. The reactor and contents are heated to 65° C. for about 6 hours and subsequently neutralized with oxalic acid. Reduced pressure is applied to the reactor and water removed therefrom until the reaction mixture is about 80 weight percent solids. The reaction mixture has an apparent viscosity of 6,000 centipoises at 25° C. as measured on a Brookfield rotational viscometer. The neutralized hydroxide reaction mixture is then admixed with about one percent by weight based on the weight of the resin of a silicone glycol-type surfactant commercially available under the trade designation "DC-193" (The Dow Corning Corporation) and 11 weight percent trichlorotrifluoroethane boiling at 47.6° C., 3 parts by weight of concentrated hydrochloric acid and 3 parts by weight ethylene glycol. The mixture is deposited on the belt at the head or entrance end at a rate of about 50 grams per minute. The belt speed is 4.5 inches per minute. The temperature of the enclosure is 60° C. The belt speed gives an inventory time of the foamable composition on the belt of about 40 minutes. A foam board having an excellent rectangular configuration and a relatively smooth surface is removed from the machine. The foam board has a density of about 3.4 pounds per cubic foot. Continuous molding of the composition to form a board of rectangular cross-section shows no significant deterioration of the polypropylene belts over an extended period of time.

A foamable polyurethane composition is obtained by providing components (A) crude diphenylmethane diisocyanate having an -NCO content of 32.1 percent and an -NCO equivalent weight of 130.9, and (B) a mixture of 74.8 parts by weight of a sucrose initiated polypropylene ether having a viscosity at 77° F. of about 55,000 centipoises; 22.2 parts by weight of trichlorofluoromethane; 1.8 parts by weight of triethylenediame; 1.2 parts by weight of a silicone glycol ether as a cell control agent commercially available under the trade designation of "DC-193" (The Dow Corning Corporation). Components (A) and (B) are admixed in the weight ratio of 1:1.81 and employed in the hereinbefore described apparatus. The mixture is deposited at the head or belt in the entrance end at a rate of about 400 grams per minute. The belt speed is 60 inches per minute. The temperature of the enclosure is 65° C. The inventory time is 3 minutes. A satisfactory rectangular board is obtained having a density of about 2.4 pounds per cubic foot.

The procedure of the foregoing illustration is repeated with the exception that both the lower belt and upper belt are overlaid with a web of glass cloth and a foam board is prepared having glass cloth integrally bonded to the polyurethane plank.

An epoxy resin foam is prepared from a liquid epoxy resin having a viscosity of 150 poises at 25° C. having an epoxide equivalent of 210 and an average molecular weight of 400. One hundred parts of the resin are mixed with 2 parts of 4,4'-oxybis(benzenesulfonylhydrazide); 0.1 part of polyoxyethylenesorbitan monolaureate, commercially available under the trade designation "Tween-20;" 5 parts by weight toluene. When mixing is complete, 6 parts of diethylenetriamine are added with vigorous mixing and the mixture immediately applied to the belt of the hereinbefore described apparatus at a rate of 400 grams per minute. The belt speed is 20 inches per minute. The enclosure temperature is 85° C. and the inventory time 9 minutes. A rectangular epoxy resin board is obtained having a density of about 7.2 pounds per cubic foot.

A urea-formaldehyde foam is prepared in the following manner: (A) resin preparation: 100 parts by weight of UF Concentrate-85 (60 percent formaldehyde, 25 percent urea, 15 percent water); 35 parts by weight urea; 2.5 parts by weight ehtylene glycol and 90 parts by weight water are mixed and adjusted to pH 8 with 4 Normal sodium hydroxide. The reaction mixture is stirred and heated to 95° C. This temperature is maintained for 30 minutes during which time the pH drops slowly to 6.6. The resin solids concentration at this stage is about 52 percent and the solution contains a total of 11.35 percent by weight, based on the weight of the solution, of free and combined formaldehyde, of which 1.3 percent is free formaldehyde and 10.05 percent is combined as methylol groups. At the end of 30 minutes, 0.5 milliliter of 4 Normal formic acid is added which reduces the pH of the reaction mixture to 5.0. Heating is then continued at about 115° C. in a pressure autoclave for 5 minutes. The reaction mixture is cooled and the pH raised to 8.0 with 4 Normal NaOH. Viscosity at 25° C. is 25 centipoises. The free formaldehyde content of the resin solution is 0.60 percent; the methylol content is 0.40 percent. Addition of 2 grams of ammonium bicarbonate reduces the free formaldehyde content of the resin to 0.2 percent; (B) hardener solution: a hardener solution is prepared by dissolving 2 grams of Nacconol SZA in 100 grams 0.1 Normal sulphuric acid solution. One part by weight of the resin preparation is rapidly mixed with two parts of the hardener solution and deposited on the belt at the entrance end at a rate of about 50 grams a minute. The belt speed is 4 inches per minute and the temperature of the enclosure is maintained at about 80° C. The inventory time is 45 minutes and a rectangular urea-formaldehyde foam plank is obtained having a density of about 3.5 pounds per cubic foot.

A flexible polyurethane foam is prepared in the following manner: 100 parts by weight of a polyethertriol which is the condensation product of propylene oxide and ethylene glycol having an average molecular weight of about 3500; 96.5 parts by weight toluene diisocyanate; 4 parts by weight water; triethylenediamine 0.1 part by weight; stannous octoate 0.3 part by weight; trichlorofluoromethane 1.2 parts by weight and a silicone glycol ether 1.2 parts by weight are blended together in a mixing head under pressure of about 30 pounds per square inch gauge at room temperature. The mixture is immediately discharged from the mixing head via a nozzle into the open end of the previously described belt molding machine at a rate of about 40 grams per minute. The belt speed is about 6 inches per minute. The temperature of the enclosure about the belt is 65° C. and the rate of travel of the belt is about 6 inches per minute. A flexible rectangular board is discharged from the belt. The board has a density of 2.5 pounds per cubic foot.

A cementitious board is prepared employing the hereinbefore described belt molding apparatus utilizing a feed mixture of 300 parts by weight of Ottawa silica sand, 100 parts by weight portland cement, 58 parts by weight water and 2 parts by weight calcium chloride. The calcium chloride is initially dissolved in the water and added to a dry mixture of the portland cement and the silica sand. The composition is relatively slow setting and mixture of a fresh batch every 30 minutes is found adequate to provide continuous feed for the belt molding apparatus. The mixture is deposited on the belt at the entrance end and compacted by means of a manually operated ram at a rate of about 0.38 pound per minute. The belt speed is about one-half inch per minute providing an inventory time of 6 hours. The enclosure about the belt is maintained at a temperature of about 50° C. Polypropylene dividing strips are placed transversely on the belt at the feed end at 4 foot intervals. The top belt is spaced from the upper surface of the mixture a distance of about 2 inches. Steam is bled intermittently into the enclosure and excess water removed by vacuum. The product is concrete panels which are removed from the discharge end of the belt and subsequently cured by storage at about 75° C. at 80 percent relative humidity for a period of 7 days. The panels have a smooth outer surface with a density of about 100 pounds per cubic foot.

Water-extended polyester planks are prepared employing the following formulation: polyester 100 parts by weight; styrene monomer 100 parts by weight; water 100 parts by weight; cobalt octoate 12 percent solution, 2.5 parts by weight; dimethylaniline 1 part by weight; methyl ethyl ketone peroxide 1 part by weight. The styrene and polyester are first admixed and the cobalt octoate and dimethylaniline are subsequently added and mixed. The water is added to the mixture with a high shear mixer to form a milky emulsion. When satisfactory dispersion of the water is obtained, the methyl ethyl ketone peroxide is added and the mixture poured on the belt at a rate of 4.55 pounds per minute. The enclosure surrounding the belt is maintained at a temperature of 50° C.; the belt speed or rate of travel is about 1 foot per minute to provide an inventory time of about 15 minutes. The product is a hard white fine-grained rectangular board having a density of about 65 pounds per cubic foot and containing water droplets which generally range in size from about 5 to 10 microns.

A syntactic foam is prepared from a liquid epoxy resin and glass microspheres employing the following formulation: an epoxy resin having an epoxide equivalent weight of about 180 and a viscosity at 125° C. of about 12,000 centipoise. The glass microspheres employed have a bulk density of about 14 pounds per cubic foot and a true particle density of about 26 pounds per cubic foot. The glass microspheres are of a borosilicate glass. One hundred parts by weight of the resin are mixed rapidly with 6 parts by weight of diethylenetriamine and 50 parts by weight of glass microspheres are added rapidly and the mixture immediately applied to the belt at an average rate of about 2.1 pounds per minute. The belt speed is about 1 foot per minute and the average temperature of the enclosure is about 50° C. The inventory time is about 15 minutes. The resultant product is a rectangular, glass microsphere-filled epoxy board having a density of about 30 pounds per cubic foot.

An apparatus generally in accordance with FIG. 9 is employed using a single polypropylene belt which is grooved and hinged and a former employed for the configuration set forth in FIGS. 10–13. Employing the hereinbefore set forth formulations, excellent pipe covering is obtained. After 60 hours of operation, the polypropylene belt is still in excellent condition.

In a manner similar to the foregoing illustrations, a wide variety of shapes are obtained in accordance with the method and apparatus of the present invention.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. An apparatus for the continuous casting of hardenable materials, the apparatus comprising in cooperative combination at least
   a first support and
   a second support,
   a first drum and
   a second drum, at least
   one first endless forming belt, the forming belt having
   a central portion,
   a first edge portion and
   a second edge portion, the belt having
   integral hinge portions between the edge portions and the central portions, the forming belt passing over the first drum and the second drum and forming a continuous loop having a forming side and a return side, the belt having a surface which is non-adherent to the hardenable material being formed,
   means to apply a hardenable material to the non-adherent surface,
   means to deform the belt to form a desired curing configuration for the hardenable material, the means to deform the belt deforming the belt to a degree which does not exceed the elastic limit thereof.

2. The apparatus of claim 1 wherein the means to deform the belt deforms the belt to form a configuration having a closed cross-sectional configuration.

3. The apparatus of claim 1 including a second forming belt oppositely disposed to the first forming belt and adapted to cooperate with the first forming belt and form a closed configuration.

4. The apparatus of claim 1 wherein the means to deform the belt comprises a plurality of guides which successively deform the belt into a generally cylindrical configuration.

5. The apparatus of claim 1 wherein at least the continuously hinged belt is polypropylene.

6. The apparatus of claim 1 wherein the belt has a thickness of from about 20 to 100 mils, the hinge portion being from about 10 mils to 20 to 80 percent of the thickness of the belt.

* * * * *